(12) United States Patent
Gantman et al.

(10) Patent No.: US 7,533,735 B2
(45) Date of Patent: *May 19, 2009

(54) DIGITAL AUTHENTICATION OVER ACOUSTIC CHANNEL

(75) Inventors: Alexander Gantman, San Diego, CA (US); Gregory Gordon Rose, Concord (AU)

(73) Assignee: Qualcomm Corporation, San Diego, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 10/625,710

(22) Filed: Jul. 22, 2003

(65) Prior Publication Data
US 2004/0133789 A1 Jul. 8, 2004

Related U.S. Application Data

(63) Continuation-in-part of application No. 10/139,873, filed on May 6, 2002, which is a continuation-in-part of application No. 10/077,365, filed on Feb. 15, 2002, now Pat. No. 7,251,730.

(51) Int. Cl.
*H04L 9/00* (2006.01)
(52) U.S. Cl. .......................... 173/182; 726/26; 726/27
(58) Field of Classification Search .................. 713/182; 704/246; 455/563
See application file for complete search history.

(56) References Cited

U.S. PATENT DOCUMENTS

| 5,481,611 | A | * | 1/1996 | Owens et al. ............... 713/159 |
| 5,623,637 | A | | 4/1997 | Jones et al. ................. 395/491 |
| 5,696,879 | A | | 12/1997 | Cline et al. ................ 395/2.69 |
| 5,953,700 | A | * | 9/1999 | Kanevsky et al. ......... 704/270.1 |
| 6,615,171 | B1 | * | 9/2003 | Kanevsky et al. ........... 704/246 |
| 2005/0047514 | A1 | * | 3/2005 | Bolinth et al. .............. 375/261 |

* cited by examiner

*Primary Examiner*—Pramila Parthasarathy
(74) *Attorney, Agent, or Firm*—Amin, Turocy & Calvin, LLP

(57) ABSTRACT

Method and apparatus for controlling access to a secure network, system or application is disclosed. In one embodiment, an apparatus for requesting authentication includes a storage medium that stores a cryptographic key, a processor that generates an access code using the cryptographic key, a converter that converts the access code into sound waves, and an audio output unit that outputs the sound waves encoded with the access code for authentication. An apparatus for granting authentication includes a storage medium that stores a cryptographic key, an audio input unit that receives sound waves encoded with a access code, a converter that recovers the access code from the sound waves, and a processor that generates a second access code using the cryptographic key and grants authentication if the access code corresponds to the second access code.

61 Claims, 6 Drawing Sheets

DIGITAL AUTHENTICATION OVER ACOUSTIC CHANNEL

CROSS-REFERENCE TO RELATED APPLICATIONS

This application is a continuation-in-part of U.S. application Ser. No. 10/139,873 filed May 6, 2002 and entitled "System and Method for Acoustic Two Factor Authentication," which is a continuation-in-part of U.S. application Ser. No. 10/077,365 filed Feb. 15, 2002 now U.S. Pat. No. 7,251,730 and entitled "Method and Apparatus for Simplified Audio Authentication," both of which are assigned to the same assignee and herein incorporated by reference.

This application is also related to the following, all of which are assigned to the same assignee of this application.

Co-pending U.S. application Ser. No. 09/611,569 filed Jul. 7, 2000 and entitled "Method and Apparatus for Secure Identity Authentication With Audible Tones."

Co-pending U.S. application Ser. No. 10/356,144 filed Jan. 30, 2003 and entitled "Wireless Communication Using Sound."

Co-pending U.S. application Ser. No. 10/356,425 filed Jan. 30, 2003 and entitled "Communication Using Audible Tones."

BACKGROUND

1. Field of Invention

The invention generally relates to authentication and more particularly to electronic security and, more particularly to authentication of entities using sound.

2. Description of the Related Art

With the growth of electronic commerce, use of public communication infrastructure, such as the Internet, to access various secure networks, systems and/or applications has also grown. For example, users may gain access to banks (online or by automatic teller machines (ATM)), a private network such as an intranet, a secure server or database or other virtual private network (VPN) over the Internet by digital authentication.

However, with the introduction of a system of communication wherein face-to-face contact is not possible, opportunities for fraudulent or unauthorized access have increased. Misappropriated identity in the hands of wrongdoers may cause damage to individuals, organizations or other entities.

In order to prevent unauthorized access, various security schemes have been developed to verify user or entity identification such that only authorized entities are given access. One common technique is by requiring a user to provide the correct password. Because this technique uses a single factor to authenticate a user, systems implementing this technique may be more susceptible to attacks by an unauthorized users.

Another common technique for user authentication is known as the two-factor authentication. Two-factor authentication is typically based on something that a user has, for example a physical device, and something that a user knows, such as a password. Because both pieces of information is used to authenticate a user, systems implementing the two-factor authentication may be less susceptible to attacks than a single-factor authentication.

For example, a password generating token is a two-factor authentication system designed to control access. Here, a unique password is generated and continuously displayed to a user. The password is generated from an algorithm that is based on a secure information and the current time. The user is then required to input the current displayed password to gain access.

While a password generating device may prevent unauthorized access, it is cumbersome because users must manually enter each password during each access. Also, errors are more likely to occur due to the manual input of the password. In some systems, a user is required to input a password more than once during each access, which increases the inconvenience and possibility of errors. Furthermore, because the password is based on time and is continuously displayed, a constant computation is required by the device, thereby shortening battery life of the device.

Therefore, there is a need for a more efficient and/or more convenient as well as secure way to implement a control access system using a device.

SUMMARY

Embodiments disclosed herein address the above stated needs by providing a method for security in a data processing system.

In one aspect, an apparatus for requesting authentication comprises a storage medium configured to store a cryptographic key; a processor coupled to the storage medium and configured to generate an access code using the cryptographic key; a converter coupled to the processor and configured to convert the access code into sound waves encoded with the access code; and an audio output unit coupled to the converter and configured to output the sound waves encoded with the access code for authentication.

The apparatus may further comprise a clock coupled to the processor and configured to generate a time element; wherein the processor is configured to generate the access code using the cryptographic key and the time element. The apparatus may also comprise an audio input unit configured to receive sound waves encoded with a challenge; wherein the converter recovers the challenge; and the processor is configured to generate the access code using the cryptographic key and the challenge. The apparatus may further comprise an actuator coupled to the processor and configured to receive a signal that activates the generation of the access code. In addition, the apparatus may comprise a user input unit configured to receive a first password; wherein the storage medium is configured to store a second password; and wherein the processor is configured to generate the access code if the first password corresponds to the second password. Furthermore, the apparatus may comprise a user input unit configured to receive a password; wherein the converter is configured to encode the password into sound waves; and wherein the audio output unit is configured to output the sound waves encoded with the password for authentication.

In another aspect, a method for requesting authentication from a user device storing a cryptographic key, comprises generating an access code using the cryptographic key; converting the access code into sound waves encoded with the access code; and outputting the sound waves encoded with the access code for authentication. The method may comprise generating a time element; wherein generating the access code comprises generating the access code using the cryptographic key and the time element. The method may comprise receiving sound waves encoded with a challenge; and recovering the challenge; wherein generating the access code comprises generating the access code using the cryptographic key and the challenge.

In still another aspect, an apparatus for requesting authentication comprises means for storing a cryptographic key;

means for generating an access code using the cryptographic key; means for converting the access code into sound waves encoded with the access code; and means for outputting the sound waves encoded with the access code for authentication.

In a further aspect, a machine readable medium for use in requesting authentication comprises code segment configured generate an access code using a cryptographic key; code segment configured to convert the access code into sound waves encoded with the access code; and code segment configured to output the sound waves encoded with the access code for authentication.

In still a further aspect, an apparatus for authenticating comprises a storage medium configured to store a cryptographic key; an audio input unit configured to receive sound waves encoded with an access code; a converter coupled to the audio input unit and configured to recover the access code from the sound waves; and a processor coupled to the storage medium and the converter, the processor configured to verify the access code based on the cryptographic key.

The apparatus may comprise a clock coupled to the processor and configured to generate a time element; wherein the processor is configured to verify the access code based on the cryptographic key and the time element. The apparatus may also comprise an audio output unit configured to output sound waves encoded with a challenge; wherein the processor is configured to generate the challenge; the converter is configured to encode the challenge into the sound waves encoded with the challenge; and the processor is configured to verify the access code based on the cryptographic key and the challenge. The storage medium may be configured to store a first password; the audio input unit may be configured to receive sound waves encoded with a second password; the converter may be configured to recover the second password; and the processor may be configured to generate the challenge if the first password corresponds to the second password. In addition, the apparatus may comprise receiver unit configured to receive a first password; wherein the storage medium is configured to store a second password; and the processor is configured to generate the challenge if the first password corresponds to the second password. Moreover, the storage medium may be configured to store a first password; the audio input unit may be configured to receive sound waves encoded with a second password; the converter may be configured to recover the second password; and the processor may be configured to verify the access code if the first password corresponds to the second password. The apparatus may comprise receiver unit configured to receive a first password; wherein the storage medium is configured to store a second password; and the processor is configured to verify the access code if the first password corresponds to the second password.

In yet another aspect, a method for authenticating in a verifier device storing a cryptographic key, comprises receiving sound waves encoded with an access code from an entity; recovering the access code from the sound waves; and verifying the access code based on the cryptographic key. The method may further comprise generating a time element; wherein verifying the access code comprises verifying the access code based on the cryptographic key and the time element. The method may further comprise generating a challenge; encoding the challenge into the sound waves encoded with the challenge; outputting sound waves encoded with a challenge; wherein verifying the access code comprises verifying the access code based on the cryptographic key and the challenge.

In still another aspect, an apparatus for authenticating comprises means for storing a cryptographic key; means for receiving sound waves encoded with an access code from an entity; means for recovering the access code from the sound waves; and means for verifying the access code based on the cryptographic key.

In yet a further aspect, a machine readable medium used for authenticating comprises code segments for receiving sound waves encoded with a access code from an entity; code segments for recovering the access code from the sound waves encoded with the access code; and code segments for verifying the access code based on the cryptographic key.

Finally, in the above embodiments, the cryptographic key may be a public key corresponding to a private key. Alternatively, the cryptographic key may be a symmetric key.

BRIEF DESCRIPTION OF THE DRAWINGS

Various embodiments will be described in detail with reference to the following drawings in which like reference numerals refer to like elements, wherein.

DETAILED DESCRIPTION

Generally, embodiments disclosed use the acoustic channel for digital authentication of a user or entity. In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary details. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, the term "sound wave" refers to acoustic wave or pressure waves or vibrations traveling through gas, liquid or solid. Sound waves include ultrasonic, audio and infrasonic waves. The term "audio wave" refers to sound wave frequencies lying within the audible spectrum, which is approximately 20 Hz to 20 kHz. The term "ultrasonic wave" refers to sound wave frequencies lying above the audible spectrum and the term "infrasonic wave" refers to sound wave frequencies lying below the audible spectrum. The term "storage medium" represents one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other devices capable of storing, containing or carrying codes and/or data. The term "authentication" refers to verification of an identity, and the terms authentication and verification will be used interchangeable.

Figure 1:
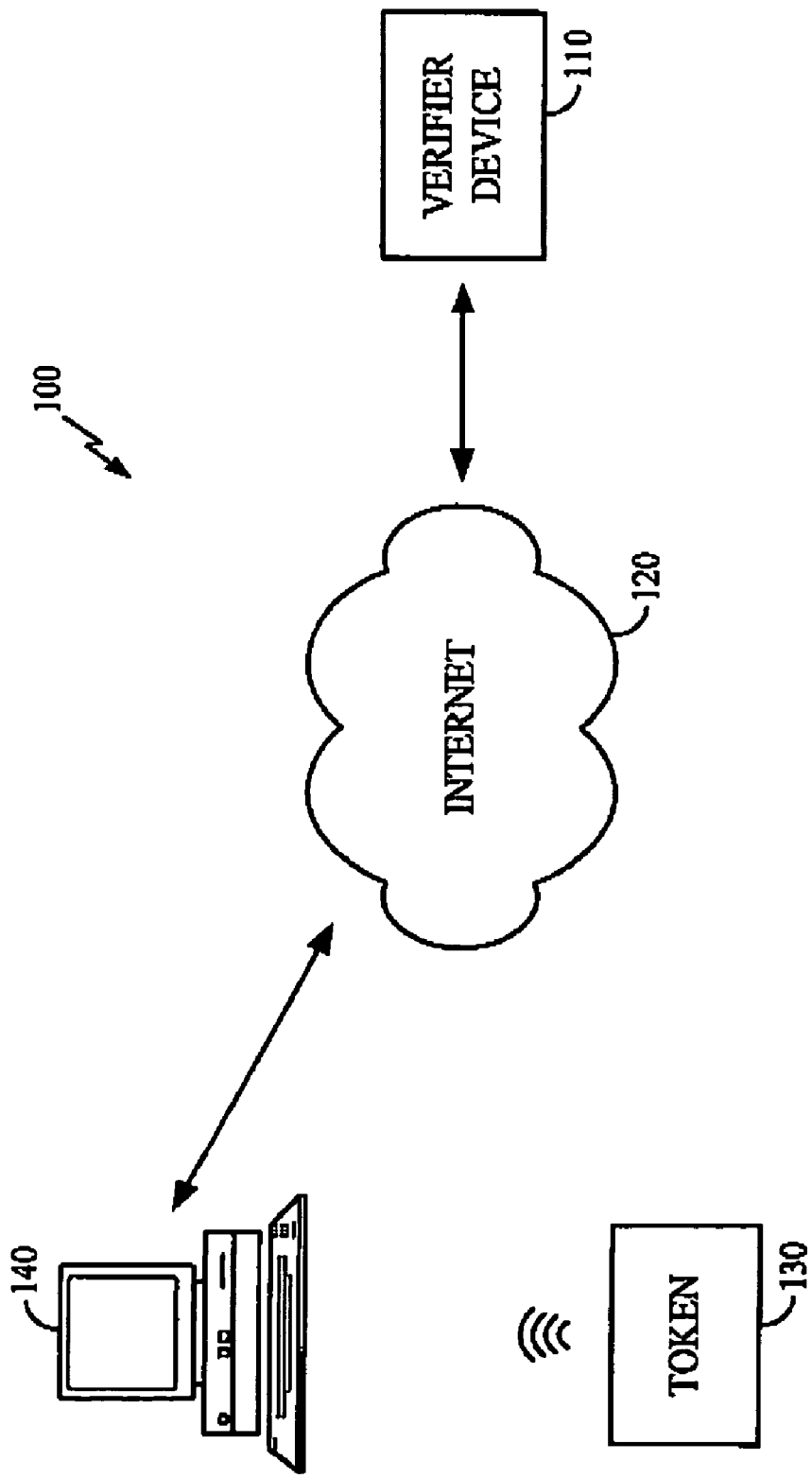
FIG. 1 shows a system for digital authentication over an acoustic channel.

FIG. 1 shows an example system 100 for digital authentication over an acoustic channel. In system 100, a verifier device 110 controls access to a secure network, system and/or application over a public communication infrastructure such as the Internet 120. To gain access over Internet 120, a user device such as a token 130 provides an access code to verifier device 110 through a wireless communication device (WCD) 140. The access code is communicated from token 130 to WCD 140 through an acoustic channel. More particularly, the access code is generated using a cryptographic key that is securely stored within token 130 and is encoded into sound waves for communication.

User of token 130 also provides a user information such as a username to verifier device 130. Here, the user information may be encoded into sound waves and communicated along with the access code to WCD 140. WCD 140 then transmits the sound waves encoded with the access code and user information to verifier device 110 over Internet 120 for authentication. Alternatively, the user information may be entered directly into WCD 140. In such case, user information is not encoded into sound waves. WCD 140 then transmits the user information and the sound waves encoded with the access code to verifier device 110 over Internet 120 for authentication. In still another alternative embodiment, the user information may be an assigned identification number of token 130. Thus, a user need not input the user information. The identification number is encoded automatically into sound waves along with the access code and communicated to WCD 140. WCD 140 then transmits the sound waves encoded with the access code and the identification number to verifier device 110 over Internet 120 for authentication. Once access is granted, WCD 140 may be used to communicate with the secure network or system.

Token 130 is typically a portable device that may be small enough to attach to a key chain. Physical possession of token 130 provides an aspect of the required verification, in the same manner that the physical possession of a key allows an individual to gain access through a locked door. Therefore, token 130 serves as an authentication tool and does not have wireless communication capabilities to transmit an access code to verifier device 110 over Internet 120. As a result, the access code is transmitted over Internet 120 by WCD 140. It is to be noted, however, that in alternative embodiments, token 130 may be embedded into another device such as a wireless phone or a personal data assistant. Also; although WCD 140 is shown as a personal desktop computer, it may be various other computing devices such as but is not limited to laptop computer, PDAs, wireless phones or security devices of homes, offices or vehicles.

The access code is generated using a cryptographic key that is securely stored within token 130. The cryptographic key may be placed into token 130 at manufacture and is not known by the user. Here, two types of cryptographic keys may be used for digital authentication, symmetric cryptographic system and asymmetric cryptographic system. In symmetric cryptographic system, the secret key or symmetric key that is kept secret within token 130 is shared and placed in verifier device 110. Token 130 generates a digital signature using a secret key and sent to verifier device 110 for authentication. Verifier device 110 verifies the digital signature based the same secret key. In asymmetric cryptographic system, a private key and a public key are generated for a user. The public key is shared with verifier device 110 while the private key is kept secret within token 130. A digital signature is generated using the private key and sent to verifier device 110. Verifier device 110 then verifies the digital signature based on the user's public key.

In the above description, verifier device 110 identifies the cryptographic key that corresponds to a user based on the user information sent with the access code. Also, verifier device 110 may be implemented as part of the secure network or system into which a user wants access. Alternatively, verifier device 110 may be located externally from the secure network or system. Moreover, although FIG. 1 show one verifier device 110, it would be apparent to those skilled in the art that there may be more than one verifier device, each controlling access to one or more networks/systems.

Figure 2:
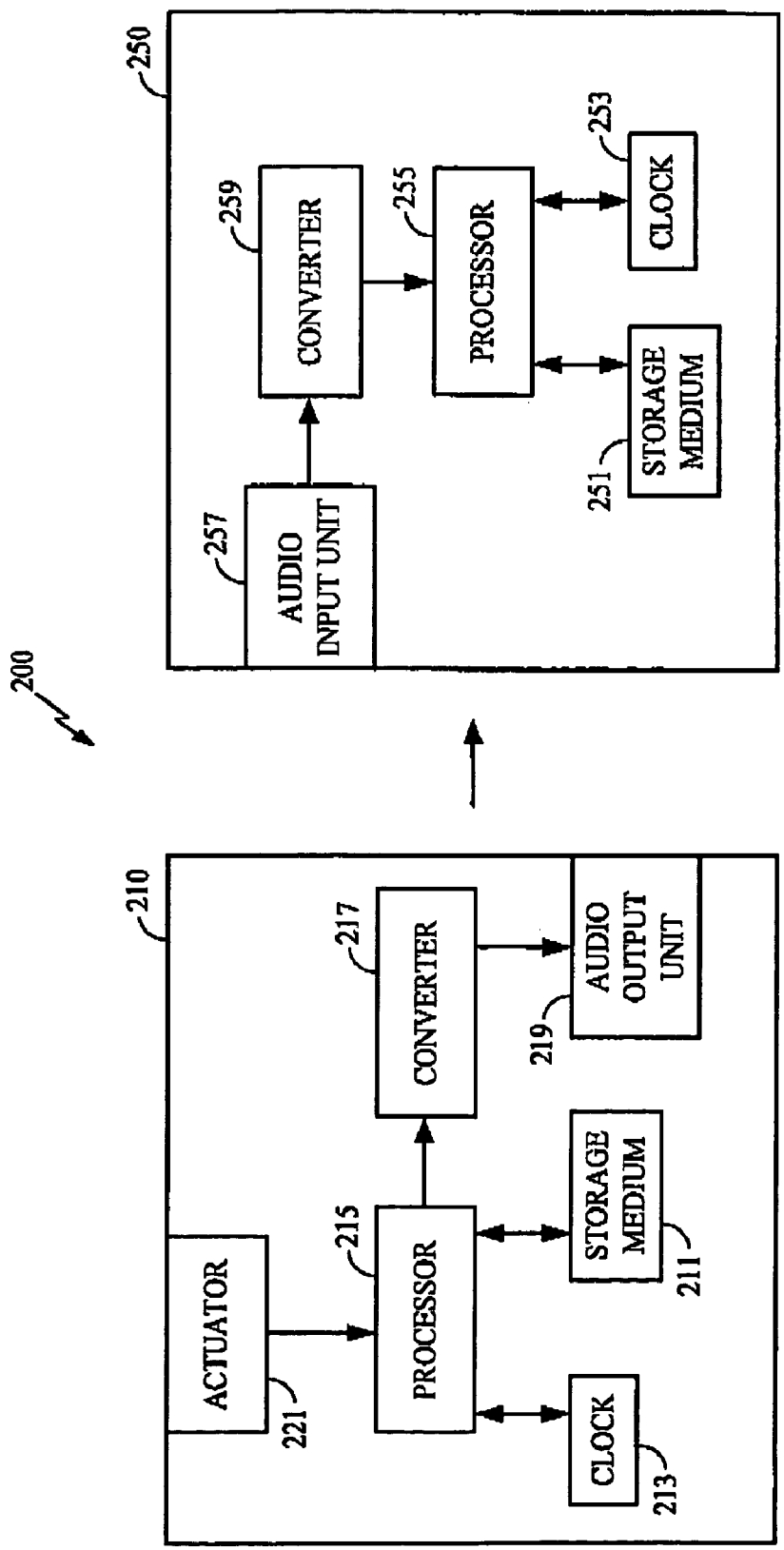
FIG. 2 shows embodiments of a token and corresponding verifier device.

FIG. 2 is a block diagram of system 200 showing an embodiment of a token 210 and corresponding verifier device 250. Token 210 comprises a storage medium 211 configured to store a cryptographic key, clock 213 configured to generate a clock element, a processor 215 configured to generate an access code using the cryptographic key and the time element, a converter 217 configured to encode the access code into sound waves, and an audio output unit 219 configured to output the sound waves encoded with the access code for verification. Token 210 may also comprise an activator or actuator 221 configured to receive a signal that activates the authentication procedure. Actuator 221 may be, but is not limited to, a switch, a push-button switch, a toggle switch or a dial or sound activated device.

Verifier device 250 comprises a storage medium 251 configured to store a cryptographic key, a clock 253 configured to generate a time element, a processor 355 configured to generate an access code using the cryptographic key and the time element, an audio input unit 257 configured to receive sound waves encoded with an access code from a user of a token, and a converter 259 configured to recover the access code from the sound waves. Based on the cryptographic key, processor 355 authenticates the access code of the user.

In system 200, clocks 213 and 253 are synchronized to generate a time element periodically, for example every minute, hour, day or other selected increment as needed. This type of authentication is typically referred to as a session based authentication since the access code changes with each period of time. Also, storage medium 251 may be a database of cryptographic keys corresponding to different users of a network, system or application. Therefore, user information is sent to verifier device 250, as discussed above, such that the appropriate cryptographic key is used at verifier 250 in the authentication procedure.

Figure 3:
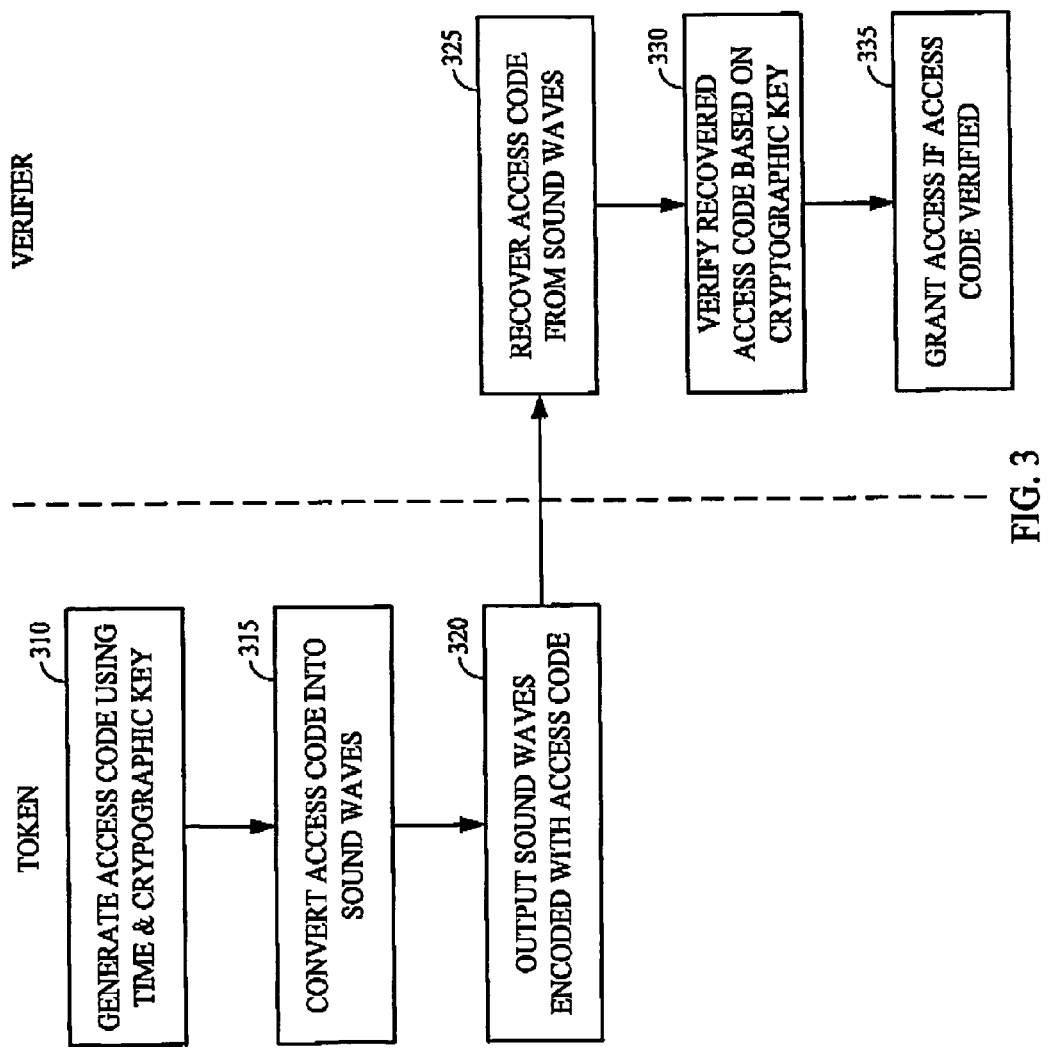
FIG. 3 shows a authentication procedure.

FIG. 3 shows an authentication procedure 300. For access to a secure network, system or application, an access code is generated by processor 215 using a current time element from clock 213 and a cryptographic key from storage medium 211 (310). The access code is encoded into sound waves (315) by converter 217 and the sound waves encoded with the access code is output by audio output unit 219 for authentication (320). An access code may be generated, converted and output from token 210 when a user inputs a signal though actuator 221.

When verifier device 250 receives through audio input unit 257 sound waves encoded with an access code for authentication, the access code is recovered (325) by converter 259. The recovered access code is then verified (330) by processor 355 and access is granted if the access code is verified. More particularly, processor 355 verifies the recovered access code based on a current time element from clock 253 and the cryptographic key from storage medium 251. Here, the cryptographic key corresponding to user information provided to verifier device 250 is used for the generation of the access code. Also, processor 355 may use any one of known algorithms or techniques to verify the access code, depending on the type of cryptographic system.

Figure 4:
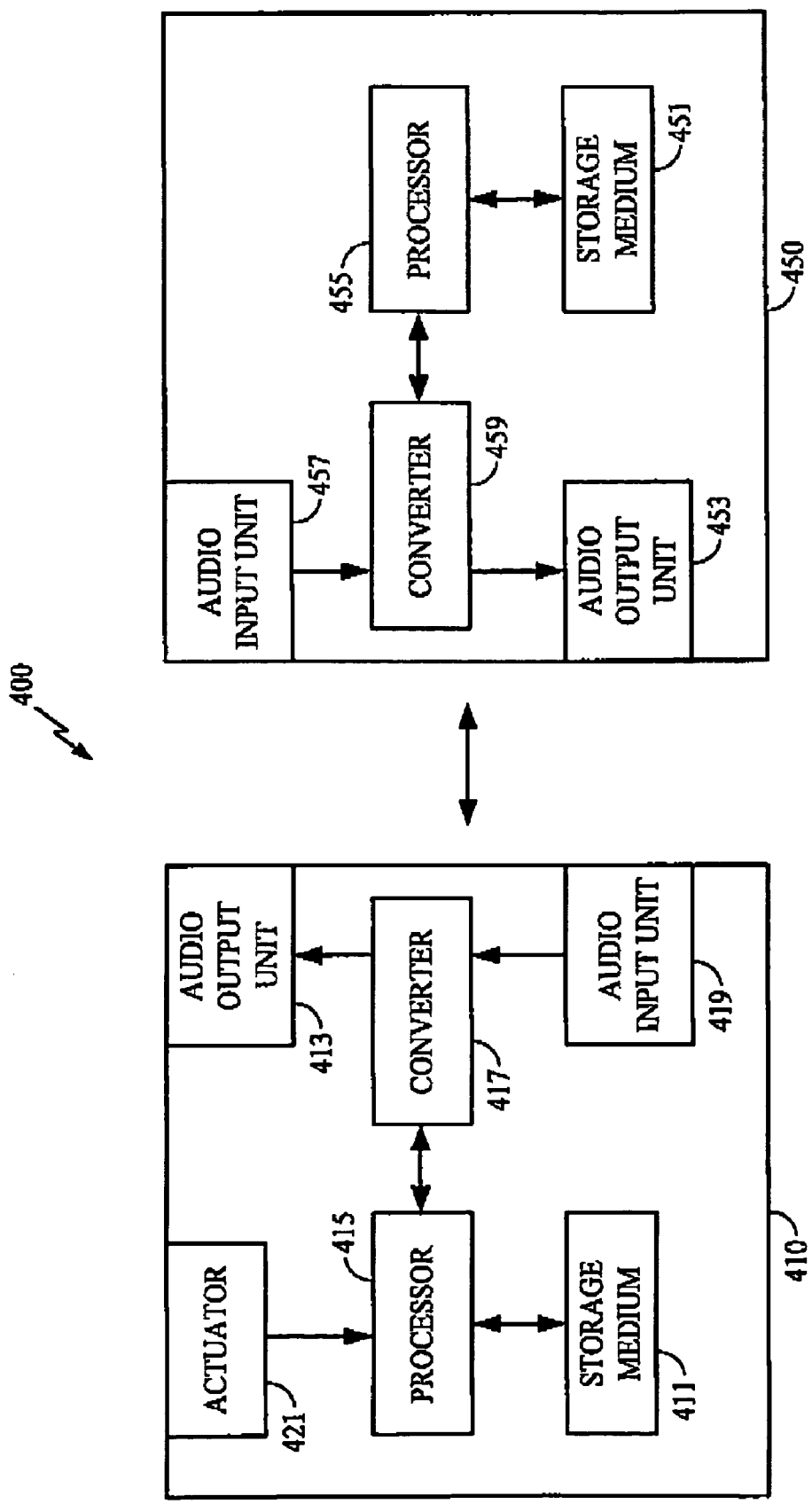
FIG. 4 shows another embodiments of a token and corresponding verifier device.

FIG. 4 is a block diagram of a system 400 showing another embodiment of a token 410 and corresponding verifier device 450. Token 410 comprises a storage medium 411 configured to store a cryptographic key, an audio input unit 213 configured to receive sound waves encoded with a challenge from an verifier device, a processor 415 configured to generate an access code using the cryptographic key and the challenge, a converter 417 configured to recover the challenge from the sound waves encoded with the challenge and to encode the access code into sound waves, and an audio output unit 419 configured to output the sound waves encoded with the access code for verification. Token 410 may also comprise an activator or actuator 421 configured to receive a signal that activates the authentication procedure. Actuator 421 may be, but is not limited to, a switch, a push-button switch, a toggle switch, a dial or sound activated device.

Verifier device 450 comprises a storage medium 451 configured to store a cryptographic key, an audio output unit 253 configured to output sound waves encoded with a challenge to a user of a token, a processor 355 configured to generate an access code using the cryptographic key and the challenge, an audio input unit 457 configured to receive sound waves encoded with an access code, and a converter 259 configured to encode the challenge into sound waves encoded with the challenge and to recover the access code from the sound waves. Processor 455 verifies the access code based on the cryptographic key and the challenge.

In system 400, a challenge may be a random number. Access codes generated using a challenge may be referred to as a response. Also, storage medium 451 may be a database of cryptographic keys corresponding to different users of a network, system or application. Therefore, user information is sent to verifier device 450, as discussed above, such that the appropriate cryptographic key is used at verifier 450 in the authentication procedure.

Figure 5:
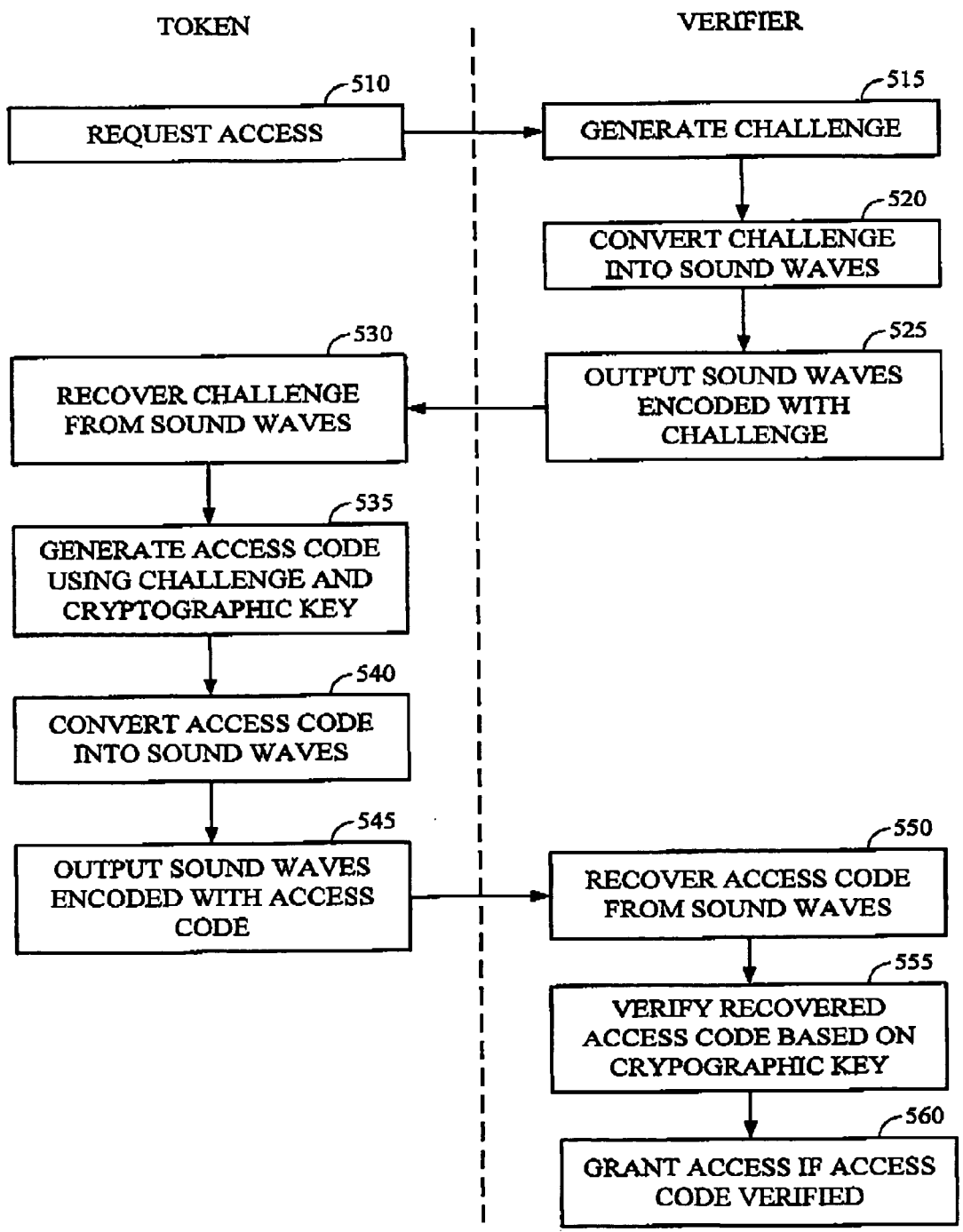
FIG. 5 shows another authentication procedure.

FIG. 5 shows an authentication procedure 500 for system 400. For access to a secure network, system or application, a request for access is sent (510) by user to verifier device 450. The request may be communicated to a WCD as sound waves encoded with the request or may be directly input to a WCD for transmittal to verifier device 450. When verifier device 450 receives the request, a challenge is generated (515) by processor 455. The challenge is encoded into sound waves encoded with the challenge (520) by converter 459 and the sound waves encoded with the challenge is output (525) through the audio output unit 253.

The sound waves encoded with the challenge is then received through audio input unit 413 of token 410 and the challenge is recovered from the sound waves (530) by converter 417. Using the cryptographic key from storage medium 411 and the recovered challenge, an access code is generated (535) by processor 415. The access code is encoded into sound waves (540) by converter 417 and the sound waves encoded with the access code is output (545) for authentication by audio output unit 419.

When verifier device 450 receives through audio input unit 457 sound waves encoded with an access code for authentication, the access code is recovered (550) by converter 459. The recovered access code is then verified (555) by processor 455 and access is granted if the access code is verified (560). More particularly, processor 455 verifies the recovered access code based on the challenge and a cryptographic key from storage medium 451. Here, the cryptographic key corresponding to user information provided to verifier device 450 is used for the generation of the access code. Also, processor 455 may use any one of known algorithms or techniques to verify the access code, depending on the type of cryptographic system.

Therefore, systems 200 and 400 control access over the Internet to a secure network, system or application based on the access code. In some embodiments, systems 200 and 400 may be combined such that verification of an access code is based on both a time element and a challenge. A token would then comprise both a clock and an audio input unit as described above, and an access code would be generated using a time element generated by the clock and a challenge received through the audio input unit. Similarly, verifier device would comprise both a clock and an audio output unit as described above, and an access code would be verified based on a time element generated by the clock and the challenge output through the audio output unit. Additionally, it should be noted that a commercial token may comprise additional elements, including but not limited to, a power source such as a battery. Similarly, a commercial verifier device may comprise additional elements.

Moreover, a two-factor authentication process may also be implemented by requiring the user to input a correct password. Here, the cryptographic key stored in a token creates the first factor and the password creates the second factor.

For example, in systems 200 and 400, token 210 or 410 may further comprise an input unit (not shown). The input unit may be a partial or full keyboard. When a user receives a token, user enters a password to initialize the token. The password may be a custom personal identification number (PIN) and is stored in storage medium 411 or 451. Alternatively, the password may be an assigned password provided to the user. Thereafter, each time a user wishes to access a secure network, system or application, the user is required to input though the input unit the correct password to activate the token. Alternatively, the received password may be encoded into sound waves by converter 217 or 417 and output along with the sound waves encoded with the access code for verification. In such case, passwords would also be stored with corresponding user information and cryptographic key at verifier device 250 or 450, or the password may be used as the user information. Thus, when verifier device 250 or 450 receives the sound waves encoded with the access code and the password, both the password and access code are recovered and verified to grant access.

In another embodiment, verifier device 250 or 450 may further comprise a receiver (not shown). Users are required to create a password associated with a secure network, system or application through a WCD. Thereafter, each time a user wishes to access the network, system or application, the user is required to input the correct password. The password and sound waves encoded with the access code is then sent to verifier device 250 or 450. As in the previous example, passwords would also be stored with corresponding user information and cryptographic key at verifier device 250 or 450, or the password may be used as the user information. Here, the password would be received by the receiver. Thus, when verifier device 250 or 450 receives the password and sound waves encoded with access code, both the access code is recovered and both the access code and password are verified to grant access.

Furthermore, although any known technique may be used to encode digital data such as the access code or password into sound waves, or to recover digital data such as the access code or password from sound waves, a multi-carrier (MC) modulation may be used to encode digital data into sound waves and MC demodulation is used to recover the digital data from sound waves. Particularly, in one embodiment, the access code and/or password is converted to and from audio waves. Audio waves having frequencies in the range of approximately 1 kHz to 3 kHz are used such that a standard speaker can be used for the audio output unit and a standard microphone may be used for the audio input unit. A multi-carrier system is described in co-pending U.S. application Ser. No. 10/356,144 and co-pending U.S. application Ser. No. 10/356,425.

Figure 6:
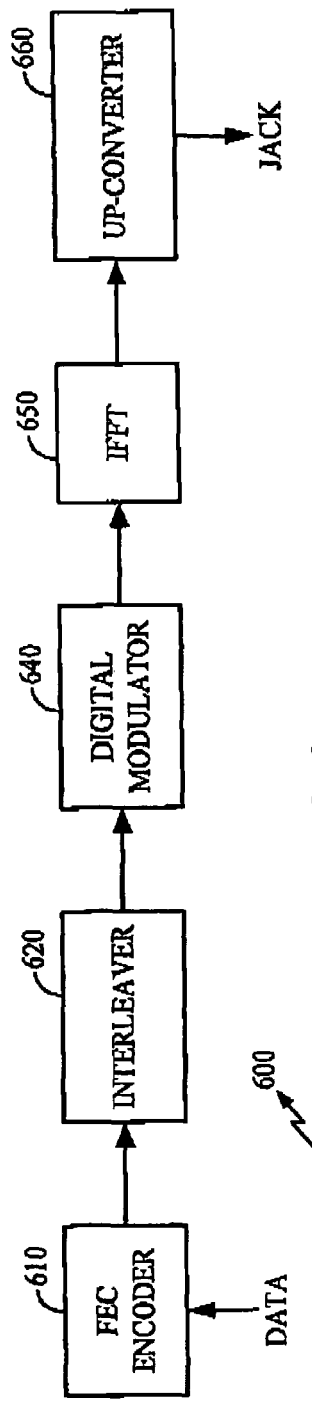
FIG. 6 shows an example converter for encoding data into sound waves.

FIG. 6 shows an example first conversion unit 600 for encoding digital data into outgoing multiple sound wave carriers. First conversion unit 600 may comprise a forward error correction (FEC) element 610, an interleaver 620, a digital modulator 640, an inverse fast fourier transform (IFFT) element 650 and an up-converter 660. First conversion unit 600 may also comprise a preamble generator (not shown) configured to generate synchronization preambles. The synchronization preambles are transmitted to help a receiving device in synchronizing to the frequency, time and phase of the received signal. FEC element 610 is configured to encode digital data bit sequence to be transmitted. The FEC encoded bits are then interleaved into code symbols by interleaver 620. The code symbols are modulated into multiple audio wave carriers by digital modulator 640 and inverse fast fourier transformed by IFFT element 650 to generate analog signals, called MC symbols. The MC symbols are then up converted by up-converter 660 for output as audio waves encoded with digital data through audio output unit. Thus, first conversion unit 600 may be implemented in converters 217, 417 and 459 for encoding an access code and/or password into sound waves.

Figure 7:
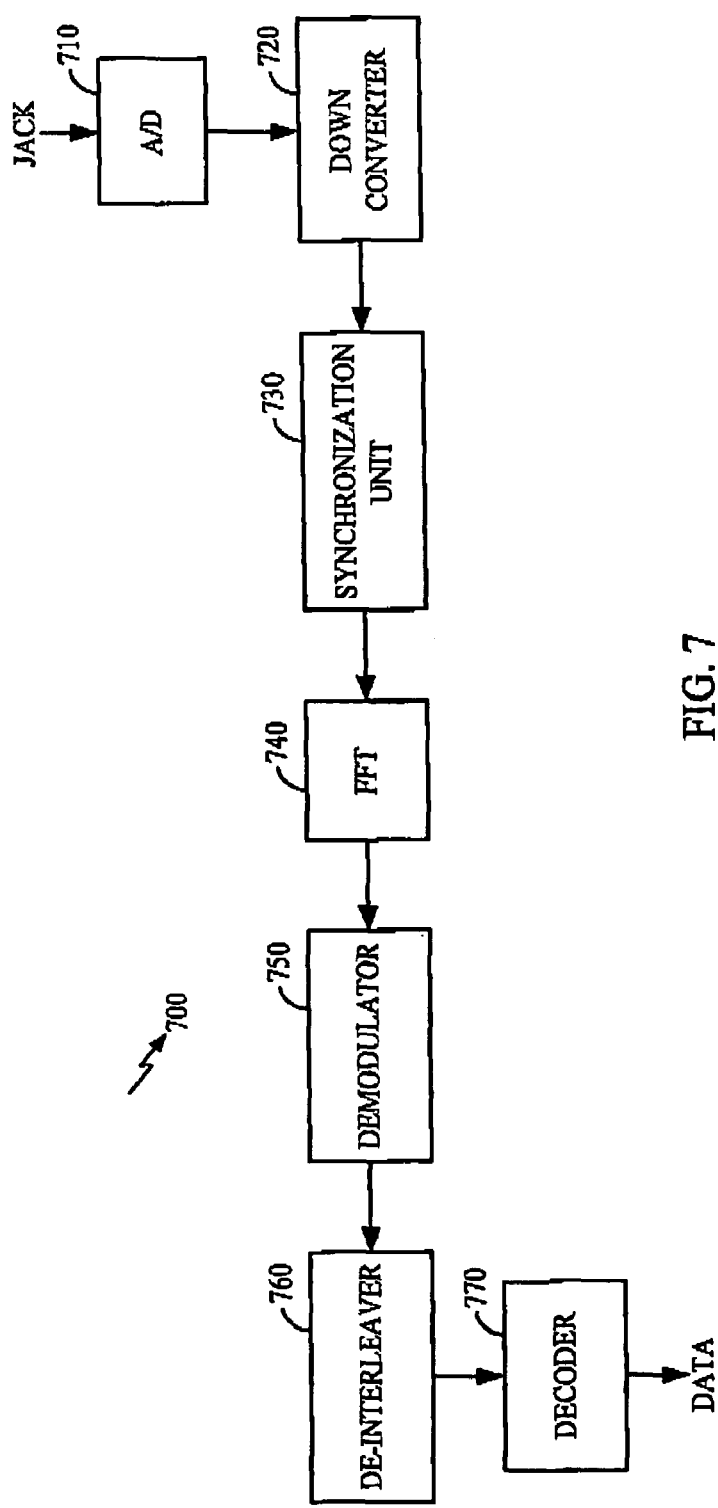
FIG. 7 shows an example converter for recovering data from sound waves.

FIG. 7 shows an example second conversion unit 700 corresponding to first conversion unit 600 for processing multiple audio waves encoded with digital data information. Generally, digital data is recovered from the multiple audio waves in a process that is inverse to the process for transmitting the data as audio waves. Second conversion unit 700 may comprise an analog to digital (A/D) converter 710 configured to convert the incoming multiple audio waves from an analog to a digital signal, a down-converter 720 configured to down convert the digital signal, a synchronization unit 730 configured to synchronize to the carrier in phase and arrival time of incoming data sequence, a fast fourier transform (FFT) 740 configured to recover the MC symbols, a demodulator 750 configured to demodulate the MC symbols, a de-interleaver 760 configured to de-interleave the demodulated data, and a decoder 770 configured to decode the de-interleaved data using one of various known techniques and recover the digital data. Thus, second conversion unit 700 may be implemented in converters 259, 417 and 459 for recovering an access code and/or password from sound waves.

Accordingly, access code and/or password may be encoded into and recovered from sound waves. By using the acoustic channel to input an access code for authentication, there is no need for a display or a constant computation needed for displaying an access code, thereby elongating the battery life of a token. Moreover, since the access code is not manually entered by a user, less errors are less likely to occur, especially in a system that requires a user to input an access code more than once during each access. In addition, because a standard speaker and/or microphone may be used, the system can easily be implemented without incurring significant cost.

Finally, embodiments may be implemented by hardware, software, firmware, middleware, microcode, or any combination thereof. When implemented in software, firmware, middleware or microcode, the program code or code segments to perform the necessary tasks may be stored in a machine readable medium such as storage medium 211, 251, 411 or 451 or in a separate storage(s) not shown. A processor such as processor 215, 255, 415 or 455 may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

For example, FFT 740, demodulator 750, de-interleaver 760 and decoder 770 of conversion unit 700 may be implemented as software stored in a storage medium, and performed by a processor. Also, although first conversion unit 600 and second conversion unit 700 are shown to be implemented together in converter 417 and 459 respectively for token 410 and verifier device 450, first and second conversion units may be implemented separately into two converters. Moreover, it should be apparent to those skilled in the art that the elements of token 210 or 410 may be rearranged without affecting the operation of the token. Similarly, the elements of verifier device 250 or 450 may be rearranged without affecting the operation of the verifier device.

Therefore, the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. Apparatus for requesting authentication comprising:
  a storage medium configured to store a cryptographic key;
  a processor coupled to the storage medium and configured to generate an access code using the cryptographic key;
  a converter coupled to the processor and configured to convert the access code into acoustic sound waves encoded with the access code, the converter encoding the access code into the acoustic sound waves using multicarrier modulation; and
  an audio output unit coupled to the converter and configured to output the acoustic sound waves encoded with the access code for authentication.

2. The apparatus of claim 1, wherein the cryptographic key is a private key corresponding to a public key.

3. The apparatus of claim 1, wherein the cryptographic key is a symmetric key.

4. The apparatus of claim 1, further comprising:
  a clock coupled to the processor and configured to generate a time element; and wherein
  the processor is configured to generate the access code using the cryptographic key and the time element.

5. The apparatus of claim 1, further comprising:
  an audio input unit configured to receive acoustic sound waves encoded with a challenge; wherein the converter recovers the challenge; and the processor is configured to generate the access code using the cryptographic key and the challenge.

6. The apparatus of claim 5, wherein the audio input unit comprises a microphone.

7. The apparatus of claim 1, wherein the audio output unit comprises a speaker.

8. The apparatus of claim 1, further comprising:

an actuator coupled to the processor and configured to receive a signal that activates the generation of the access code.

9. The apparatus of claim 1, further comprising:

a user input unit configured to receive a first password; wherein the storage medium is configured to store a second password; and wherein the processor is configured to generate the access code if the first password corresponds to the second password.

10. The apparatus of claim 1, further comprising:

a user input unit configured to receive a password; wherein the converter is configured to encode the password into acoustic sound waves; and wherein the audio output unit is configured to output the acoustic sound waves encoded with the password for authentication.

11. A method for requesting authentication from a user device storing a cryptographic key, comprising:

generating an access code using the cryptographic key;

converting the access code into acoustic sound waves encoded with the access code using multi-carrier modulation; and outputting the acoustic sound waves encoded with the access code for authentication.

12. The method of claim 11, wherein the cryptographic key is a private key corresponding to a public key.

13. The method of claim 11, wherein the cryptographic key is a symmetric key.

14. The method of claim 11, further comprising:

generating a time element; wherein generating the access code comprises generating the access code using the cryptographic key and the time element.

15. The method of claim 11, further comprising:

receiving acoustic sound waves encoded with a challenge; and recovering the challenge; wherein generating the access code comprises generating the access code using the cryptographic key and the challenge.

16. The method of claim 11, further comprising:

receiving a signal that activates the generation of the access code.

17. The method of claim 11, wherein the user device stores a first password and the method further comprises:

receiving a second password; wherein generating the access code comprises generating the access code if the first password corresponds to the second password.

18. The method of claim 11, further comprising:

receiving a password;

encoding the password into acoustic sound waves; and outputting the acoustic sound waves encoded with the password for authentication.

19. Apparatus for requesting authentication comprising:

means for storing a cryptographic key;

means for generating an access code using the cryptographic key;

means for converting the access code into acoustic sound waves using multicarrier modulation; and means for outputting the acoustic sound waves encoded with the access code for authentication.

20. The apparatus of claim 19, wherein the cryptographic key is a private key corresponding to a public key.

21. The apparatus of claim 19, wherein the cryptographic key is a symmetric key.

22. The apparatus of claim 19, further comprising:

means for generating a time element; wherein the means for generating the access code generates the access code using the cryptographic key and the time element.

23. The apparatus of claim 19, further comprising:

means for receiving acoustic sound waves encoded with a challenge; and means for recovering the challenge; wherein the means for generating the access code generates the access code using the cryptographic key and the challenge.

24. The apparatus of claim 19, further comprising:

means for receiving a signal that activates the generation of the access code.

25. The apparatus of claim 19, further comprising:

means for receiving a first password; and means for storing a second password; wherein the means for generating the access code generates the access code if the first password corresponds to the second password.

26. The apparatus of claim 19, further comprising:

means for receiving a password;

means for encoding the password into acoustic sound waves; and means for outputting the acoustic sound waves encoded with the password for authentication.

27. A machine readable medium for use in requesting authentication comprising:

code segment configured to generate an access code using a cryptographic key;

code segment configured to convert the access code into acoustic sound waves encoded with the access code using multicarrier modulation; and code segment configured to output the acoustic sound waves encoded with the access code for authentication.

28. The medium of claim 27, further comprising:

code segment configured to generate a time element; wherein the code segment for generating the access code generates the access code using the cryptographic key and the time element.

29. The medium of claim 27, further comprising:

code segment configured to receive acoustic sound waves encoded with a challenge; and code segment configured to recover the challenge; wherein the code segment for generating the acoustic access code generates the access code using the cryptographic key and the challenge.

30. Apparatus for authenticating comprising:

a storage medium configured to store a cryptographic key;

an audio input unit configured to receive acoustic sound waves encoded with an access code using multicarrier modulation;

a converter coupled to the audio input unit and configured to recover the access code from the acoustic sound waves, the converter recovering the access code from the acoustic sound waves using multicarrier demodulation; and a processor coupled to the storage medium and the converter, the processor configured to verify the access code based on the cryptographic key and to grant access if the access code is verified.

31. The apparatus of claim 30, wherein the cryptographic key is a public key corresponding to a private key.

32. The apparatus of claim 30, wherein the cryptographic key is a symmetric key.

33. The apparatus of claim 30, further comprising:
a clock coupled to the processor and configured to generate a time element; wherein
the processor is configured verify the access code using the cryptographic key and the time element.

34. The apparatus of claim 30, further comprising:
an audio output unit configured to output acoustic sound waves encoded with a challenge; wherein
the processor is configured to generate the challenge; and
the converter is configured to encode the challenge into the acoustic sound waves encoded with the challenge;
the processor is configured to verify the access code using the cryptographic key and the challenge.

35. The apparatus of claim 34, wherein the audio output unit comprises a speaker.

36. The apparatus of claim 34, wherein
the storage medium is configured to store a first password;
the audio input unit is configured to receive acoustic sound waves encoded with a second password;
the converter is configured to recover the second password; and
the processor is configured to generate the challenge if the first password corresponds to the second password.

37. The apparatus of claim 34, further comprising:
receiver unit configured to receive a first password; wherein
the storage medium is configured to store a second password; and
the processor is configured to generate the challenge if the first password corresponds to the second password.

38. The apparatus of claim 30, wherein the audio input unit comprises a microphone.

39. The apparatus of claim 30, wherein
the storage medium is configured to store a first password;
the audio input unit is configured to receive acoustic sound waves encoded with a second password;
the converter is configured to recover the second password; and
the processor is configured to verify the access code if the first password corresponds to the second password.

40. The apparatus of claim 30, further comprising:
receiver unit configured to receive a first password; wherein
the storage medium is configured to store a second password; and
the processor is configured to verify the access code if the first password corresponds to the second password.

41. A method for authenticating in a verifier device storing a cryptographic key, comprising:
receiving acoustic sound waves encoded with an access code using multicarrier modulation;
recovering the access code from the acoustic sound waves encoded with an access code using multicarrier demodulation; and
verifying the access code based on the cryptographic key.

42. The method of claim 41, wherein the cryptographic key is a public key corresponding to a private key.

43. The method of claim 41, wherein storing the cryptographic key is a symmetric key.

44. The method of claim 41, further comprising:
generating a time element; wherein
verifying the access code comprises verifying the access code based on the cryptographic key and the time element.

45. The method of claim 41, further comprising:
generating a challenge;
encoding the challenge into the acoustic sound waves encoded with the challenge;
outputting acoustic sound waves encoded with a challenge; wherein
verifying the access code comprises verifying the access code based on the cryptographic key and the challenge.

46. The method of claim 45, wherein the verifier device stores a first password and the method further comprises:
receive acoustic sound waves encoded with a second password; and
recovering the second password; wherein
generating the challenge comprises generating the challenge if the first password corresponds to the second password.

47. The method of claim 45, wherein the verifier device stores a first password and the method further comprises:
receiving a second password; wherein
generating the challenge comprises generating the challenge if the first password corresponds to the second password.

48. The method of claim 41, wherein the verifier device stores a first password and the method further comprises:
receiving acoustic sound waves encoded with a second password; and
recovering the second password; wherein
verifying the access code comprises verifying the access code if the first password corresponds to the second password.

49. The method of claim 41, wherein the verifier device stores a first password and the method further comprises:
receiving a second password; wherein
verifying the access code comprises verifying the access code if the first password corresponds to the second password.

50. Apparatus for authenticating comprising:
means for storing a cryptographic key;
means for receiving acoustic sound waves encoded with an access code using multicarrier modulation;
means for recovering the access code from the acoustic sound waves using multicarrier demodulation; and
means for verifying the access code based on the cryptographic key.

51. The apparatus of claim 50, wherein the means for storing the cryptographic key stores a public key corresponding to a private key.

52. The apparatus of claim 50, wherein the means for storing the cryptographic key stores a symmetric key.

53. The apparatus of claim 50, further comprising:
means for generating a time element; wherein
the means for verifying the access code verifies the access code using the cryptographic key and the time element.

54. The apparatus of claim 50, further comprising:
means for generating a challenge;
means for converting the challenge into the acoustic sound waves encoded with the challenge; and
means for outputting acoustic sound waves encoded with a challenge; wherein
the means for verifying the access code verifiers the access code based on the cryptographic key and the challenge.

55. The apparatus of claim 54, further comprising:
means for storing a first password;
means for receive acoustic sound waves encoded with a second password; and
means for recovering the second password; wherein
the means for generating the challenge generates the challenge if the first password corresponds to the second password.

56. The apparatus of claim 54, further comprising:
means for receiving a first password; and
means for storing a second password; wherein
the means for generating the challenge generates the challenge if the first password corresponds to the second password.

57. The apparatus of claim 50, further comprising
means for storing a first password;
means for receiving acoustic sound waves encoded with a second password; and
means for recovering the second password; wherein
the means for verifying the access code verifies the access code if the first password corresponds to the second password.

58. The apparatus of claim 50, further comprising:
means for receiving a first password; and
means for storing a second password; wherein
the means for verifying the access code verifies the access code if the first password corresponds to the second password.

59. A machine readable medium used for authenticating comprising:
code segment for receiving acoustic sound waves encoded with an access code using multicarrier modulation;
code segment for recovering the access code from the acoustic sound waves encoded with the access code using multicarrier demodulation; and
code segment for verifying the access code based on the cryptographic key.

60. The medium of claim 59, further comprising:
code segment for generating a time element; and wherein
code segment for verifying the access code verifies the access code based on the cryptographic key and the time element.

61. The apparatus of claim 59, further comprising:
code segment for generating challenge;
code segment for converting the challenge into audio wave encoded with the challenge;
code segment for outputting acoustic sound waves encoded with a challenge; wherein
the code segment for verifying the access code verifies the access code based on the cryptographic key and the challenge.

* * * * *